UNITED STATES PATENT OFFICE.

ORAZIO LUGO, OF JERSEY CITY, NEW JERSEY.

IMPROVEMENT IN PROCESSES OF MANUFACTURING ANIMAL CHARCOAL.

Specification forming part of Letters Patent No. 165,344, dated July 6, 1875; application filed June 26, 1875.

*To all whom it may concern:*

Be it known that I, ORAZIO LUGO, of Jersey City, in the county of Hudson and State of New Jersey, have invented certain new and useful Improvements in the Manufacture of Bone-Black, or Animal Charcoal; and I do hereby declare that the following is a full, clear, and exact description thereof, which will enable others skilled in the art to which it pertains to make and use the same.

The nature of my invention consists in manufacturing or obtaining bone-black or animal charcoal of a very superior quality from raw bones by eliminating or extracting the fatty matters therein contained by means of suitable solvents, such as benzine, benzole, naphtha, or their homologues, alcohol, ether, or bisulphide of carbon, either in the liquid state or in a state of vapor, or at an elevated temperature in closed vessels, for the purpose and in the manner hereinafter more fully specified.

The manufacture of bone-black generally proceeds, with slight modifications, as follows: The raw bones are stamped or broken into small pieces of about a cubic inch in size, and are then boiled in water, in order to extract the fatty matters. The "hard bones" are then selected or picked out and kept separate from the more porous kinds, and any adhering meat is removed. The bones are then dried and placed in retorts, to the exterior of which heat is applied. The operation is continued until the whole of the animal matter is burned or charred. The burnt bones are then removed from the retorts, and, when cold, are broken into smaller pieces, sieved, and the different sizes put on the market as new bone-black.

I have lately had occasion to test a considerable number of samples of bone-black, and have found the power of decolorization to vary to a considerable extent.

The general manner of treating the bone preparatory to burning them causes the variations of decolorizing power of the bone-black.

When the raw bones are kept in hot water sufficiently long to extract the whole of the fatty matters the nitrogenous matters are, to a great extent, dissolved and decomposed, thus giving a bone-black deficient in carbon (of a nitrogenous substance) and decolorizing power. On the other hand, should the fatty matters contained in the raw bones not be fully extracted previous to burning or charring, the bone-black or animal charcoal resulting therefrom will have a very low decolorizing power.

The carbon produced by the destructive distillation of fats has a very low decolorizing power when compared with the carbon obtained from nitrogenous matters.

The process which I have invented is as follows: The raw bones, after being cleansed from adhering meat as much as possible, are dried, and then broken into small pieces. The broken and dried bones are then placed in an apparatus suitable for the introduction of any of the solvents of fats hereinbefore mentioned, either in a state of vapor or in a liquid state, and the operation is continued until the fatty matters are extracted, or practically so. The bones thus treated are then to be placed in retorts, to which heat is applied externally, and charred in the usual way.

It will be found that the amount of tarry and gaseous matter is much less than when the bones are burned or charred in the presence of fatty matters, and also that the time required to char them is much shorter than in the ordinary process.

When the bones have been charred or burned and have become cool, they may be broken into smaller pieces, sieved into different sizes, and put on the market as animal charcoal or bone-black of a very superior quality and high decolorizing power.

The oils and fats may be recovered from the solvents by any of the known processes, such as distillation, and thus utilized, instead of injuring the bone-black, as they do in the ordinary method of making bone-black.

Having thus described my invention, what I claim, and desire to secure by Letters Patent, is—

The process herein described for producing bone-black or animal charcoal, consisting in removing the acids and fats from the bones by means of solvents such as described, and then charring, all substantially as set forth.

In testimony that I claim the foregoing as my own invention, I affix my signature in presence of two witnesses.

ORAZIO LUGO.

Witnesses:
JOHN R. MCPHERSON,
THOMAS C. CONNOLLY.